United States Patent
Burch et al.

(10) Patent No.: US 8,474,009 B2
(45) Date of Patent: Jun. 25, 2013

(54) DYNAMIC SERVICE ACCESS

(75) Inventors: Lloyd Leon Burch, Payson, UT (US);
Prakash Umasankar Mukkara, Bangalore (IN); Douglas Garry Earl, Orem, UT (US)

(73) Assignee: Novell, Inc., Provo, UT (US)

( * ) Notice: Subject to any disclaimer, the term of this patent is extended or adjusted under 35 U.S.C. 154(b) by 409 days.

(21) Appl. No.: 12/787,727

(22) Filed: May 26, 2010

(65) Prior Publication Data
US 2011/0296486 A1   Dec. 1, 2011

(51) Int. Cl.
*H04L 29/06* (2006.01)

(52) U.S. Cl.
USPC .................. 726/1; 726/11; 709/227

(58) Field of Classification Search
USPC ........................................... 726/1
See application file for complete search history.

(56) References Cited

U.S. PATENT DOCUMENTS

| | | | |
|---|---|---|---|
| 2002/0073335 A1 | 6/2002 | Shuster et al. | |
| 2004/0221045 A1* | 11/2004 | Joosten et al. | 709/227 |
| 2005/0114712 A1* | 5/2005 | Devine et al. | 713/201 |
| 2007/0008974 A1 | 1/2007 | Dispensa et al. | |
| 2007/0118667 A1 | 5/2007 | McCarthy et al. | |
| 2009/0113074 A1 | 4/2009 | Statia et al. | |

FOREIGN PATENT DOCUMENTS

| | | |
|---|---|---|
| EP | 1363424 A2 | 11/2003 |
| WO | WO-03007571 A1 | 1/2003 |
| WO | WO-2004038597 A1 | 5/2004 |
| WO | WO-2008017010 A1 | 2/2008 |

OTHER PUBLICATIONS

"European Application Serial No. 11166776.2, Extended Search Report mailed Sep. 20, 2011", 7 pgs.

* cited by examiner

*Primary Examiner* — Justin T Darrow
(74) *Attorney, Agent, or Firm* — Schwegman, Lundberg & Woessner, P.A.

(57) ABSTRACT

Apparatus, systems, and methods may operate to authenticate a desktop client to an identity service (IS), to receive a request, from an application, at the IS via the desktop client for a virtual service internet protocol (IP) address associated with a service. The IS may operate to build a routing token that includes an original physical IP address associated with the service when a policy associated with the IS permits access to the service by a user identity associated with the desktop client. After the routing token is validated, the application may be connected to the service via the desktop client. The application may comprise an e-mail application or a remote control application, such as a virtual network computing (VNC) application. Additional apparatus, systems, and methods are disclosed.

20 Claims, 4 Drawing Sheets

DYNAMIC SERVICE ACCESS

BACKGROUND

As computer workloads are distributed more widely throughout the web and among cloud architectures, determining the precise internet protocol (IP) address associated with a particular service becomes more difficult. For example, when a service begins execution, or moves between physical machines and virtual machines (VMs), the IP address for the service may change. While domain name system (DNS) servers provide a dynamic uniform resource locator (URL) to IP address lookup function, IP address changes can take days to update. In addition, once a communication session is established, DNS servers are not normally used to maintain security for the connection.

One example of the practical consequences can be seen by considering the use of a desktop machine to access a Virtual Desktop Infrastructure (VDI) service. When a remote access client application, such as VNC® Enterprise Edition software or Microsoft® Remote Desktop Connection software begins execution on the desktop, the IP address of the remote VDI service is requested by the application. This address can be entered by the user, if known. However, if the address is dynamic, and activated only when needed, the user may not know the correct address. Similar problems occur when changing the service IP address while attempting to maintain a valid connection between the desktop application and the service.

SUMMARY

In various embodiments, apparatus, systems, and methods that support dynamic service access are provided. For example, in some embodiments, dynamic service access is implemented by authenticating a desktop client to an identity service (IS); and by receiving a request, from an application, at the IS via the desktop client for a virtual service IP address associated with the service. Additional activities include building a routing token, at the IS, to include an original physical IP address associated with the service when a policy associated with the IS permits access to the service by a user identity associated with the desktop client. After the routing token is validated, the application can be connected to the service via the desktop client. Additional embodiments are described, and along with the foregoing examples, will be set forth in detail below.

DETAILED DESCRIPTION

Figure 1:
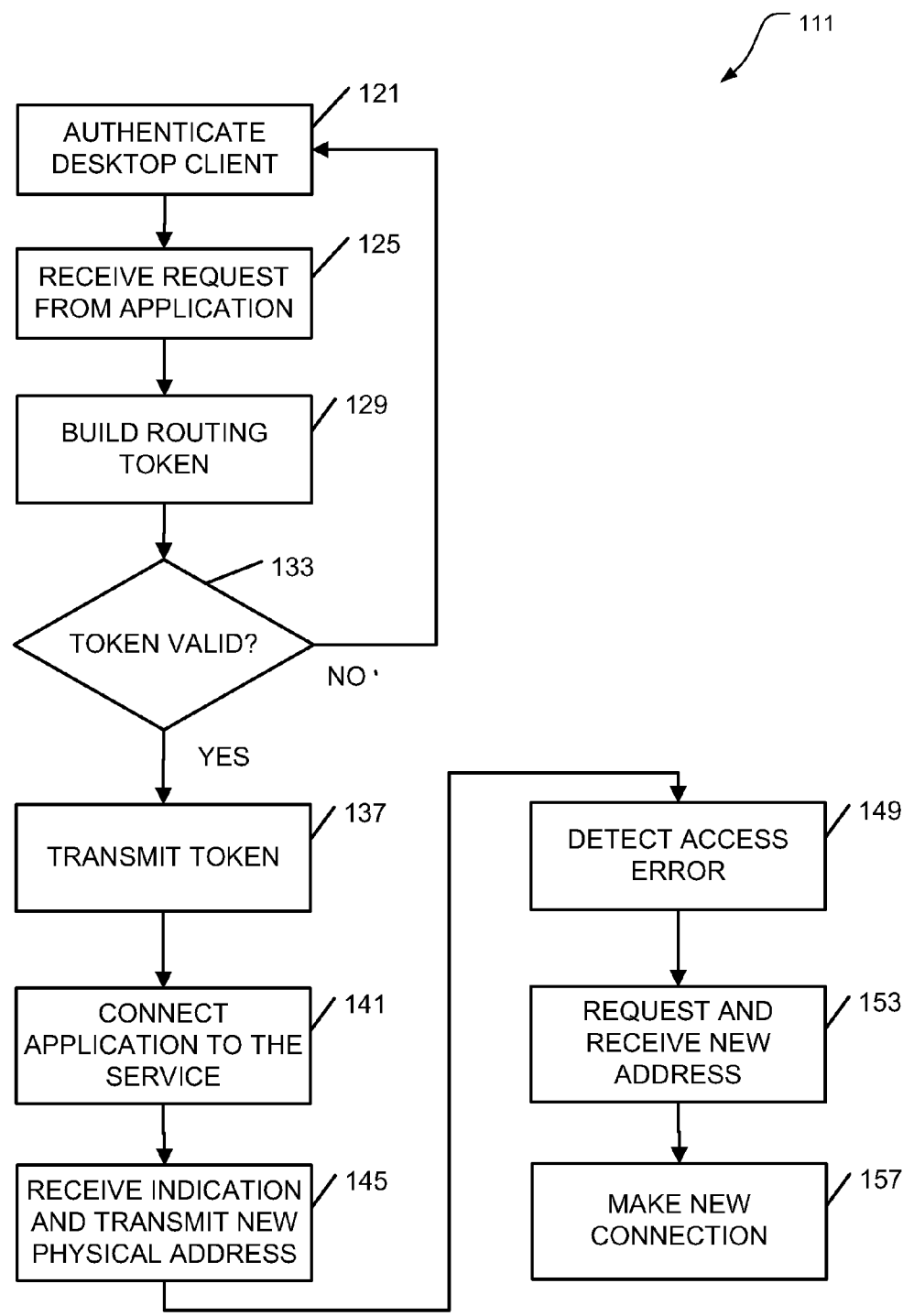
FIG. 1 is a flow diagram illustrating methods of implementing dynamic service access according to various embodiments of the invention.

In various embodiments, dynamic service access can be implemented using an IS and a virtual private network (VPN). The IS can be configured to provide authentication, identity tokens, IP mapping, VM start and stop requests, SSL-VPN IP service, and one or more IP selection policies. The VPN, such as an SSL-VPN, can be configured to provide basic SSL-VPN functionality, dynamic IP lookup from the IS, multiple outbound IP addresses from a single inbound IP address, and support for desktop virtual service IP addresses.

Thus, many embodiments operate by providing a virtual service IP (VSIP) address to the desktop. The VSIP address can be a Private IP address, perhaps taking the form of 10.x, 192.168.x or 172.16.x. It may be the same for many or all of the desktops in an enterprise in some cases.

A domain name system (DNS) server or host file can be used to define the URL of the VSIP for the desktops. An example of a DNS or host file entry might be "172.16.1.1 VService.novell.com". The VSIP address can be used by a desktop remote control application to access a server service, such as a remote VDI service, in place of the actual IP address. The VSIP address is not necessarily sent to the network; it can be intercepted by a SSL-VPN process running on the desktop, for example.

In many embodiments, the SSL-VPN client is authenticated by an IS before the remote application is executed on the client desktop machine. When the SSL-VPN client is authenticated to the IS, tokens and user data may be sent to the SSL-VPN client. The data and tokens can be used by the SSL-VPN client to determine the physical IP address of the service requested by the authenticated user. This is accomplished by using the tokens received from the IS during authentication, perhaps using the VSIP address and port accessed by the authenticated user in the request for the physical IP address of the service.

The IS can process the request from the SSL-VPN to determine whether a policy should be applied, and which policy should be applied, based on the VSIP address, port, authenticated user identity, and/or other known user and system information. Based on the policy applied, the IP address of the service is returned if the service for the identified/authenticated user is available. If the service is not running, the IS can send a request to a workload management system (WMS) system to start an instance of the service for the user defined in the token that has been received. Once the service is running, the physical IP address can be returned from the IS to the SSL-VPN. The address and the tokens can also be used by the SSL-VPN to establish a secure connection between the desktop and the service.

Once the desktop application and the service are both running, it may be useful to move the service to another machine. In most embodiments, this can be accomplished without the desktop application being made aware of the change. For example, the SSL-VPN can send a request to the IS asking for a new physical IP address. The IS can use a policy to determine the IP address for the new machine, and whether a new instance of the service should be started. The new physical IP address is then returned to the SSL-VPN, and a new connection is made by the SSL-VPN, from the desktop to the relocated service. In this case, the application running on the desktop can continue to function, without being aware of the address translation, manipulation of the secure connection identity transfer, physical IP address change, and policy that has been put in place.

The foregoing description uses the example of a remote control application, running on the desktop, and a VDI as a service, provided by a server. However, this is just one possible case. Almost any desktop application that connects to a hosted service can be used in various embodiments. A description of the process flow now follows.

To begin, it can be assumed that a user operating a desktop client has been authenticated to the IS. The user then accesses an application, such as an e-mail application (e.g., Microsoft® Outlook® application) or a remote control application (e.g., VNC® Enterprise Edition software or Microsoft® Remote Desktop Connection software). For the following example, a virtual network computing (VNC) application will be used.

The VNC application can be configured to use a VSIP address in place of the actual VDI service IP address. The VSIP address is accessed via the SSL-VPN. The SSL-VPN uses the IP address and port requested by the VNC application and the authenticated user identity to present a query to a policy maintained by the IS. If the policy allows access, the IS can query a WMS to find an instance of the requested service that is running If the service is not running, the IS can make a request to the WMS to start an instance of the service. The location of the service is returned to the IS from the WMS, and the IS then builds a routing token with this information and other policy data.

The routing token is sent to the SSL-VPN from the IS. The SSL-VPN passes the routing token and other policy data via a secure connection to the SSL-VPN server (that may also house the VDI service). The SSL-VPN server can be used to validate the routing token, and the information contained in the routing token can then be used to connect to the VDI service via the SSL-VPN server. At this point, the desktop (and the authenticated user) is securely connected to the VDI service. The VNC application does not need to be aware of the actual IP address of the service; the VNC application uses the VSIP address instead.

In another example, an e-mail application is substituted for the VNC application. The same process flow just given would follow, except that an SSL-VPN server would not be used to provide a tunnel for the connection. Instead, the SSL-VPN would receive the request from the e-mail application and use the policy maintained by the IS to send the request to an e-mail service provided by another server. The request to the e-mail service would not make use of use of the hyper-text transport protocol (HTTP) secure sockets layer (SLL) but rather, would operate to obtain the ports defined for the e-mail service. In this instance as well, the e-mail application does not need to be aware of the actual IP address of the e-mail service because the application uses the VSIP address to access the service. The policy maintained by the IS can be used to locate or start an instance of the service, if needed.

In either of these examples, if a service is being used and is thereafter halted, moved, or restarted, the IP address of the service may change. In several embodiments, when this occurs, the SSL-VPN may detect an error in the connection to the service and query the IS to find a new IP address and port that can be used. The IS can in turn query the WMS to locate the service, or to start an instance of the service. A new routing token will then be returned to the SSL-VPN from the IS. This token can be used to make a new connection between the SSL-VPN and the SSL-VPN server, or the server providing the service, depending on the particular application that is being used on the desktop. The application can thus continue to operate, without being aware that the service has been halted, moved, or restarted.

Thus, many embodiments of the invention may be realized, and each can be implemented in a variety of architectural platforms, along with various operating and server systems, devices, and applications. Any particular architectural layout or implementation presented herein is therefore provided for purposes of illustration and comprehension only, and is not intended to limit the various embodiments.

FIG. 1 is a flow diagram illustrating methods 111 of implementing dynamic service access according to various embodiments of the invention. The methods 111 are implemented in a machine-accessible and readable medium and are operational over processes within and among networks. The networks may be wired, wireless, or a combination of wired and wireless. The methods 111 may be implemented as instructions, which when accessed by a specific machine, perform the processing depicted in FIG. 1. Given this context, dynamic service access is now discussed with reference to FIG. 1.

In some embodiments, a processor-implemented method 111 can be executed on one or more processors that perform the method, operating to implement dynamic service access, as viewed from the perspective of an IS, for example. Activities may include authenticating the client, receiving a request for a VSIP address, building a routing token, and connecting the application. Thus, the method 111 may begin at block 121 with authenticating a desktop client to an IS.

The method 111 may continue on to block 125 with receiving a request, from an application, at the IS via the desktop client. In many embodiments, the request may be for a VSIP address associated with a service.

The method 111 may continue on to block 129 with building a routing token, by the IS, to include the original physical IP address associated with the service (e.g., when a policy associated with the IS permits access to the service by a user identity associated with the desktop client).

The method 111 may continue on to block 133 with determining whether the routing token is valid, perhaps using a node hosting the service, such as an SSL-VPN server. If the token is not valid, the method 111 may return to block 121 to re-authenticate the client.

If the token is determined to be a valid one at block 133, then the method 111 may continue on to block 137. At this point, the routing token can be sent to the node hosting the service, via a secure network connection. Thus, the activity at block 137 may comprise transmitting the routing token via a secure network connection to a node hosting the service.

After the routing token is validated and transmitted to the host node, the method 111 may continue on to block 141 to include connecting the application using an original connection to the service via the desktop client.

In some cases, changes may occur after the connection has been established. For example, there is the possibility of a change in the physical address for the connection.

Thus, the method 111 may continue on to block 145 with receiving, by the IS, an indication that the original physical address associated with the service has been changed to a new physical address. In some cases, a WMS, including an intelligent WMS, such as the Novell® Intelligent Workload Management System, may receive notice that the physical address of the service has changed. The WMS may in turn pass on the notice to other elements in the system. Thus, the activity at block 145 may comprise receiving the indication of the address change from a WMS.

The activity at block 145 may further include transmitting, from the IS, the new physical address to the desktop client. The new physical address for a service can be pushed to an SSL-VPN module, such as an SSL-VPN appliance, for example. Thus, the activity at block 145 may comprise transmitting the new physical address to an SSL-VPN module forming part of the desktop client.

Another possible change may encompass detecting an error in the connection, and getting a new physical address to re-connect the application. Thus, the method 111 may continue on to block 149 with detecting an error associated with accessing the service in the original connection and requesting, by the desktop client, a new physical address associated with the service. Further activity at block 149 may include receiving the new physical address at the desktop client, and making a new connection from the application to the service at the new physical address via the desktop client.

In any case, once the new physical address has been communicated, the method 111 may continue on to block 157. Here the connection can be re-instated using the new address. Other embodiments may be realized.

Figure 2:
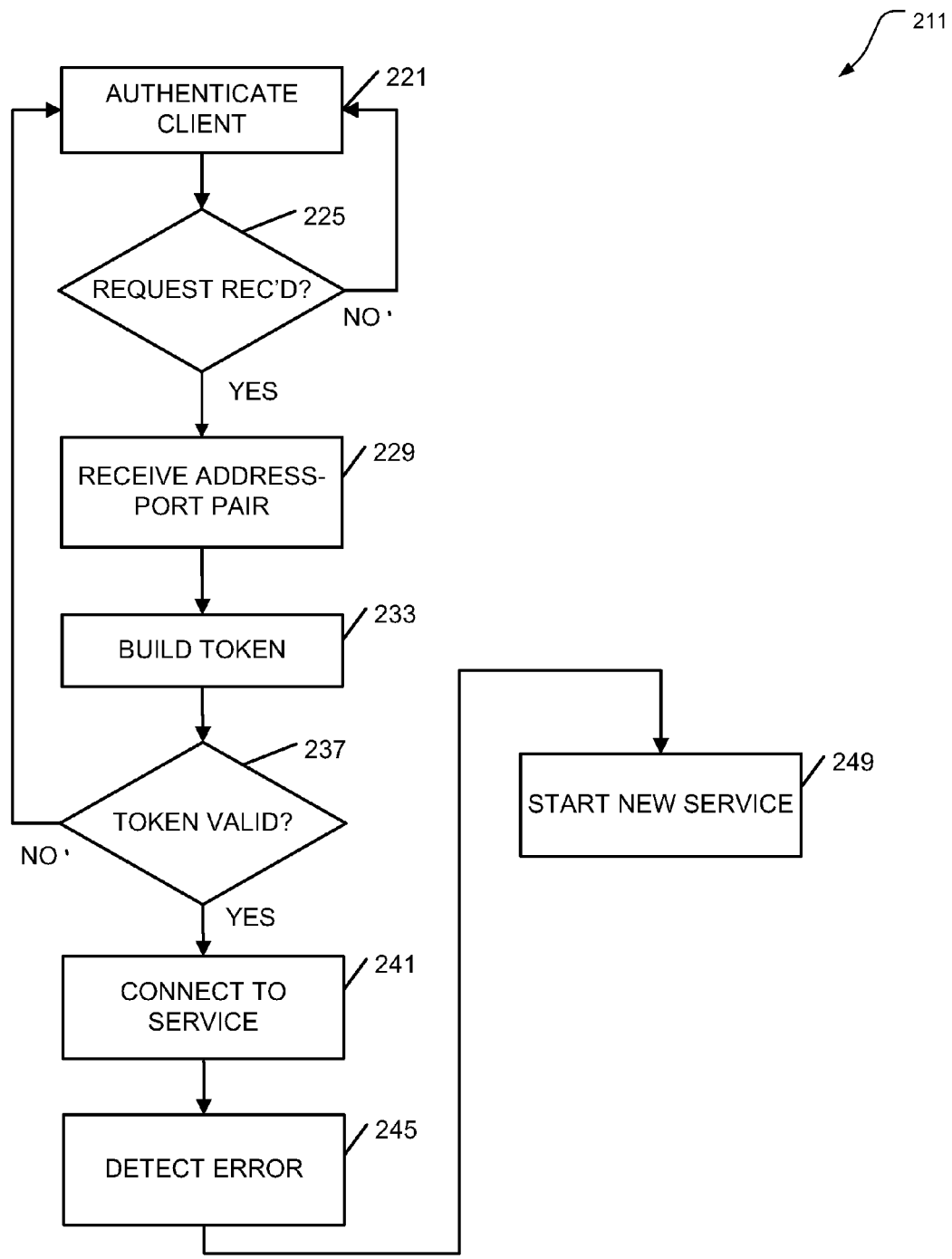
FIG. 2 is a flow diagram illustrating additional methods of implementing dynamic service access according to various embodiments of the invention.

For example, FIG. 2 is a flow diagram illustrating additional methods 211 of implementing dynamic service access according to various embodiments of the invention. In this case, the methods 211 may be viewed from the perspective of an IS operating with a reduced set of applications. The methods 211 are implemented in a machine-accessible and readable medium, and are operational over processes within and among networks. The networks may be wired, wireless, or a combination of wired and wireless. The methods 211 may be implemented as instructions, which when accessed by a specific machine, perform the processing depicted in FIG. 2.

Thus, in some embodiments, a processor-implemented method 211 that can be executed on one or more processors that perform the method may begin at block 221 with authenticating a desktop client to an IS.

The method 211 may continue on to block 225, with waiting to receive a request for an address, such as a VSIP address. Until the address request is received, the method 211 may continue to wait at block 225.

The method 211 may continue on to block with 229 with receiving the request, from an e-mail application, a remote control application (e.g., a RealVNC-VNC® software application), or some other application, at the IS via the desktop client. The request, for example, may be for a VSIP address associated with a service.

In response to the request, a VSIP address-port pair may be received by the client. Thus, the method 211 may continue on to block 229 with receiving the VSIP address and a port as an address-port pair at the desktop client in response to the request.

The method 211 may continue on to block 233 with building a routing token, by the IS, to include the original physical IP address associated with the service (e.g., when a policy associated with the IS permits access to the service by a user identity associated with the desktop client). The method 211 may then go on to block 237 to determine whether the token is valid.

An SSL-VPN server is used to validate the routing token in some embodiments. Thus, the activity at block 237 may comprise validating the routing token at an SSL-VPN server. If the token is found to be invalid, the method 211 may return to block 221.

After validating the routing token at block 237, the method 211 may continue on to block 241 with connecting the application to the service via the desktop client.

An SSL-VPN server can be used to connect the application and the service. Thus, the activity at block 241 may comprise connecting the service to the application (e.g., an e-mail application or remote control application) via the SSL-VPN server.

In some cases, such as when an e-mail service is requested, the connection between the service and the application does not use an SSL-VPN server. Thus, the activity at block 241 may comprise connecting the service as an e-mail service on an e-mail server to the e-mail application without using an SSL-VPN server.

If the requested service is not available, one can be started (or restarted). Thus, the method 211 may continue on to block 245 with detecting an error due to the requested service not being available, and then go on to block 249 with starting the service.

The methods described herein do not have to be executed in the order described, or in any particular order. Moreover, various activities described with respect to the methods identified herein can be executed in repetitive, serial, or parallel fashion. The individual activities of the methods shown in FIGS. 1 and 2 can also be combined with each other and/or substituted, one for another, in various ways. Information, including parameters, commands, operands, and other data, can be sent and received in the form of one or more carrier waves. Thus, many other embodiments may be realized.

The methods of dynamic service access shown in FIGS. 1 and 2 can be implemented in various devices, as well as in a computer-readable storage medium, where the methods are executed by one or more processors. Further details of such embodiments will now be described.

Figure 3:
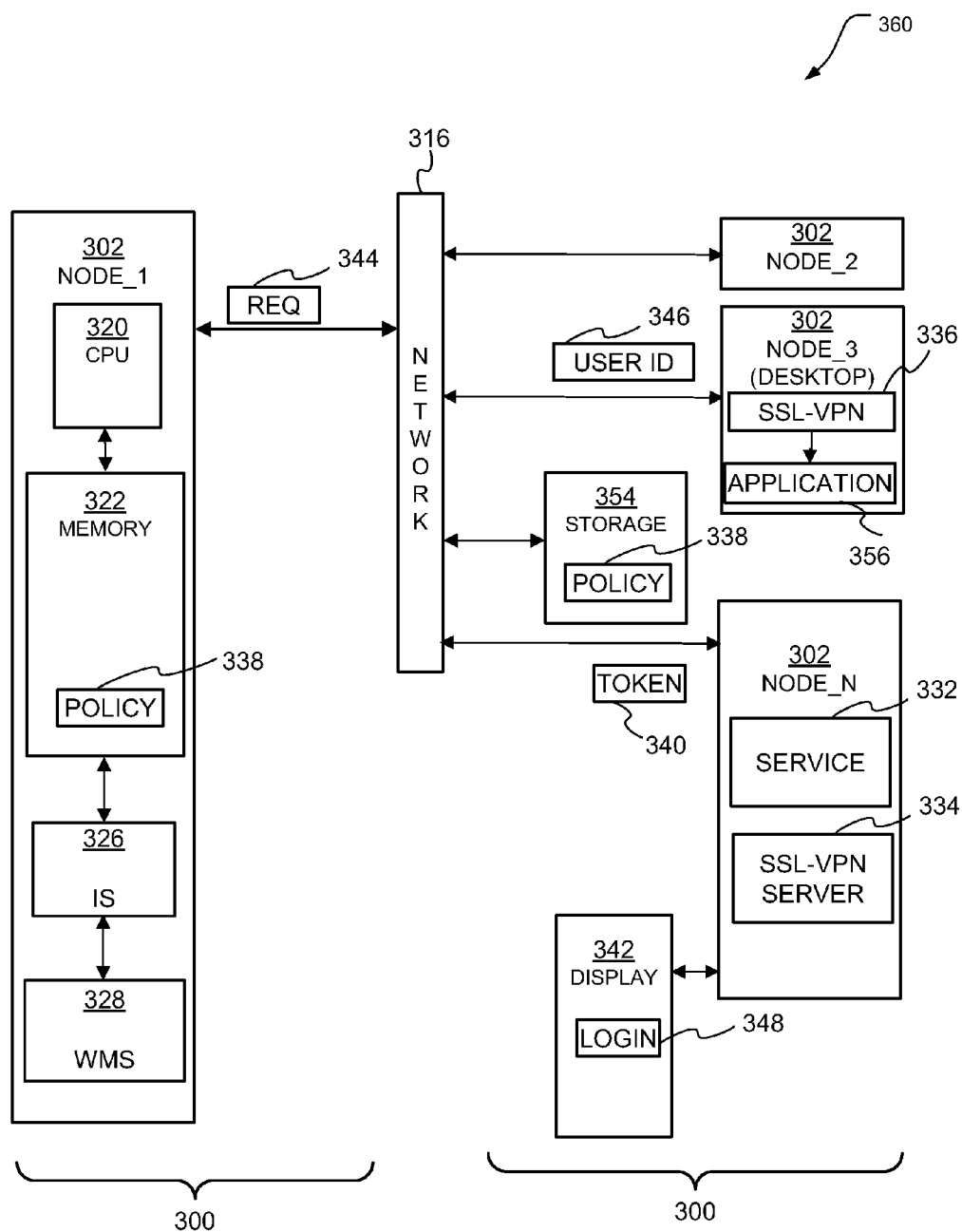
FIG. 3 is a block diagram of apparatus and systems according to various embodiments of the invention.

FIG. 3 is a block diagram of apparatus 300 and systems 360 according to various embodiments of the invention. Here it can be seen that an apparatus 300 used to implement dynamic service access may comprise one or more processing nodes 302, one or more processors 320, memory 322, an IS 326, and a WMS 328. One or more policies 338 may be included in the apparatus 300, perhaps stored in a memory 322 and/or a storage node 354.

In some embodiments, the apparatus 300 may comprise processing nodes 302 that includes an SSL-VPN module 336, one or more applications 356, one or more services 332, one or more SSL-VPN servers 334, and one or more displays 342. The apparatus 300 may comprise a server, a client, or some other networked processing node.

The processing nodes 302 may comprise physical machines or virtual machines, or a mixture of both. The nodes 302 may also comprise networked entities, such servers and/or or clients. In some implementations, the operations described can occur entirely within a single node 302.

In some embodiments then, an apparatus 300 may comprise a node (e.g., NODE_1) that includes an IS 326 to receive a request 344 from an application 356, via an authenticated desktop client (e.g., NODE_3), for a VSIP address associated with a service 332. The IS 326 may operate to build a routing token 340 that includes an original physical IP address associated with the service 332 when a policy 338 associated with the IS 326 permits access to the service 332 by a user identity 346 associated with the authenticated desktop client. The IS 326 may further operate to transmit the routing token 340 to a validation node (e.g., NODE_N) so that the application 356 can be connected using an original connection to the service 332 via the authenticated desktop client after the validation node has validated the routing token 340.

The apparatus 300 may incorporate a WMS 328, to be used for various purposes, such as detecting a change in the physical address, or starting/restarting the requested service 332. Thus, the apparatus 300 may comprise a WMS 328 operating to detect changes to the original physical address, and to start the service 332 if the service 332 is unavailable, in response to the request 338.

The policy 338 that permits access to the service 332 may be stored in various locations. Thus, the apparatus 300 may comprise a storage node 354 to store the policy 338, wherein the storage node 354 is coupled to the node that includes the IS 326 (e.g., NODE_1) via a network 316. Still further embodiments may be realized.

For example, it can be seen that a system 360 that operates to implement dynamic service access may comprise multiple instances of the apparatus 300. The system 360 might also comprise a cluster of nodes 302, including physical and virtual nodes. It should be noted that any one of the nodes 302 may include any one or more of the elements explicitly shown in any other one of the nodes NODE_1, NODE_2, . . . , NODE_N.

In some embodiments then, a system 360 can operate using one or more nodes 302. That is, a system 360 may comprise a first node (e.g., NODE_1) comprising an IS 326 to receive a request 338 from an application 356, via an authenticated desktop client (e.g., NODE_3). The request 338 may be for a VSIP address associated with the service 332, so that a routing token 340 can be built, validated, and transmitted/received, as described previously. The system 360 may also comprise a second node (e.g., NODE_N) to host the service 332. The second node may also host an SSL-VPN server 334.

In some embodiments, the system 360 may include a third node (e.g., NODE_3) to host the desktop client. The third node may include an SSL-VPN module 336 coupled to the application 356.

The nodes 302 may exist as a device embedded within another structure (e.g., as an embedded device), or as a regular desktop or laptop computer that includes a display 342 to show the activities conducted while the node 302 is active. Thus, the system 360 may also comprise a display 342 coupled to the nodes 302 to display visible indications of the activities conducted at the nodes 302, including application information, policy information, and/or login information 348.

The apparatus 300 and system 360 may be implemented in a machine-accessible and readable medium that is operational over one or more networks 316. The networks 316 may be wired, wireless, or a combination of wired and wireless. The apparatus 300 and system 360 can be used to implement, among other things, the processing associated with the methods 111 and 211 of FIGS. 1 and 2, respectively. Modules may comprise hardware, software, and firmware, or any combination of these. Additional embodiments may be realized.

Figure 4:
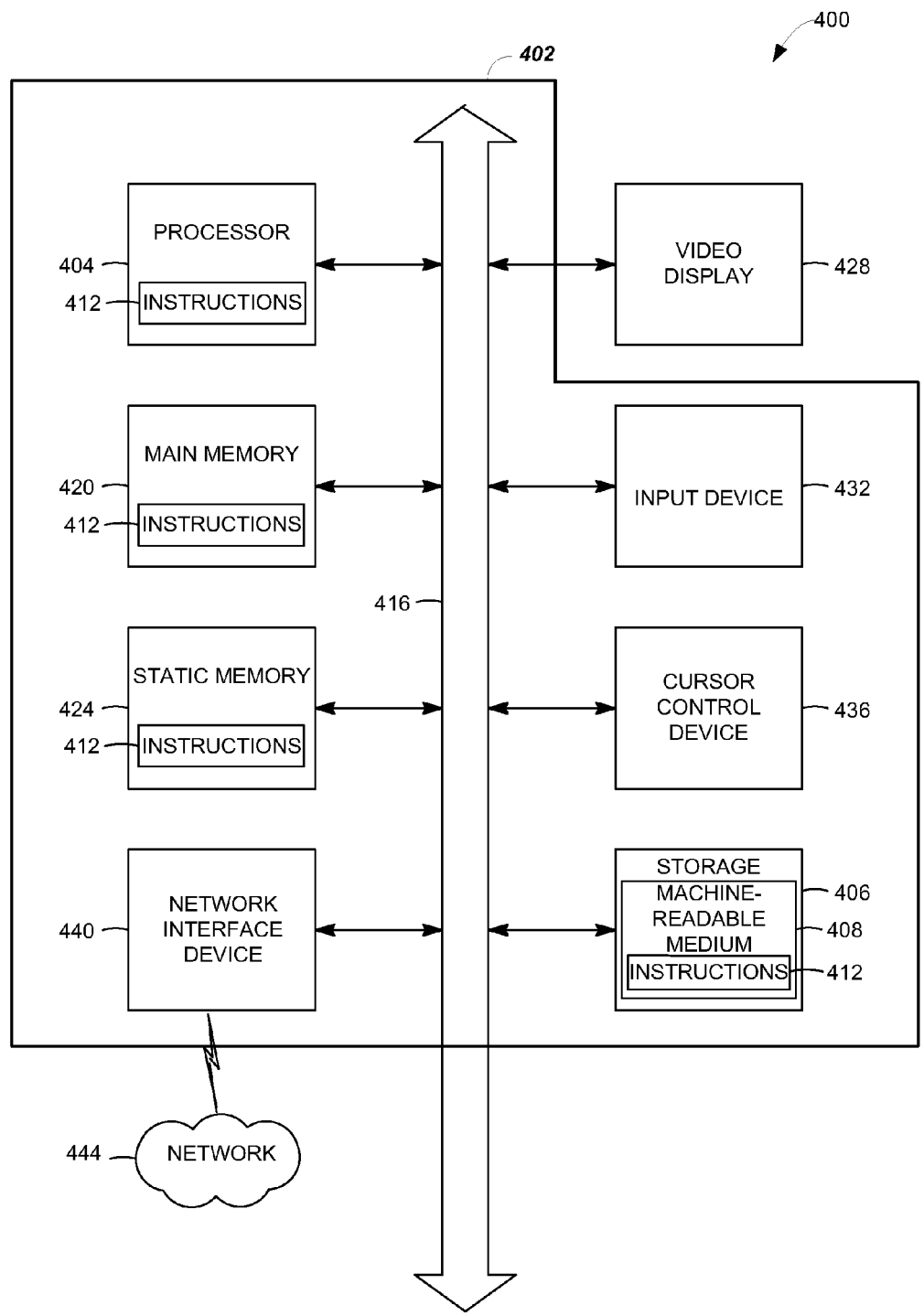
FIG. 4 is a block diagram of an article of manufacture, including a specific machine, according to various embodiments of the invention.

For example, FIG. 4 is a block diagram of an article 400 of manufacture, including a specific machine 402, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-oriented format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 400 of manufacture, such as a computer, a memory system, a magnetic or optical disk, some other storage device, and/or any type of electronic device or system may include one or more processors 404 coupled to a machine-readable medium 408 such as a memory (e.g., removable storage media, as well as any memory including an electrical, optical, or electromagnetic conductor) having instructions 412 stored thereon (e.g., computer program instructions), which when executed by the one or more processors 404 result in the machine 402 performing any of the actions described with respect to the methods above.

The machine 402 may take the form of a specific computer system having a processor 404 coupled to a number of components directly, and/or using a bus 416. Thus, the machine 402 may be similar to or identical to the apparatus 300 or system 360 shown in FIG. 3.

Turning now to FIG. 4, it can be seen that the components of the machine 402 may include main memory 420, static or non-volatile memory 424, and mass storage 406. Other components coupled to the processor 404 may include an input device 432, such as a keyboard, or a cursor control device 436, such as a mouse. An output device 428, such as a video display, may be located apart from the machine 402 (as shown), or made as an integral part of the machine 402.

A network interface device 440 to couple the processor 404 and other components to a network 444 may also be coupled to the bus 416. The instructions 412 may be transmitted or received over the network 444 via the network interface device 440 utilizing any one of a number of well-known transfer protocols (e.g., HyperText Transfer Protocol). Any of these elements coupled to the bus 416 may be absent, present singly, or present in plural numbers, depending on the specific embodiment to be realized.

The processor 404, the memories 420, 424, and the storage device 406 may each include instructions 412 which, when executed, cause the machine 402 to perform any one or more of the methods described herein. In some embodiments, the machine 402 operates as a standalone device or may be connected (e.g., networked) to other machines. In a networked environment, the machine 402 may operate in the capacity of a server or a client machine in server-client network environment, or as a peer machine in a peer-to-peer (or distributed) network environment.

The machine 402 may comprise a personal computer (PC), a tablet PC, a set-top box (STB), a PDA, a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 402 is illustrated, the term "machine" shall also be taken to include any collection of machines that individually or jointly execute a set (or multiple sets) of instructions to perform any one or more of the methodologies discussed herein.

While the machine-readable medium 408 is shown as a single medium, the term "machine-readable medium" should be taken to include a single medium or multiple media (e.g., a centralized or distributed database, and/or associated caches and servers, and or a variety of storage media, such as the registers of the processor 404, memories 420, 424, and the storage device 406 that store the one or more sets of instructions 412. The term "machine-readable medium" shall also be taken to include any medium that is capable of storing, encoding or carrying a set of instructions for execution by the machine and that cause the machine 402 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a stand-alone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Implementing the apparatus, systems, and methods described herein may operate to allow dynamically changing service IP mapping and connections. Physical connections can be based on policy, user identification, and system status, to be changed as desired. In various embodiments, a single, well-known IP address can be used by a desktop to connect to many servers at different physical IP addresses. Policies can be used to select the physical server used, based on identity data, including group membership and/or attributes. Increased network security, operational efficiency, and user satisfaction may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
   a node comprising an identity service (IS) arranged to:
   receive a request from an application, via an authenticated desktop client, for a virtual service internet protocol (IP) address associated with a service, wherein the virtual service IP is intercepted by the apparatus and not sent on to a network containing the application;
   build a routing token that includes an original physical IP address associated with the service when a policy associated with the IS permits access to the service by a user identity associated with the authenticated desktop client; and
   transmit the routing token to a validation node so that the application can be connected using an original connection to the service via the authenticated desktop client after the validation node has validated the routing token.

2. The apparatus of claim 1, further comprising:
   a workload management system to detect changes to the original physical address and to start the service if the service is unavailable, in response to the request.

3. The apparatus of claim 1, further comprising:
   a storage node to store the policy, the storage node coupled to the node via a network.

4. A system, comprising:
   a first node comprising an identity service (IS) arranged to:
   receive a request from an application, via an authenticated desktop client, for a virtual service internet protocol (IP) address associated with a service, wherein the virtual service IP is intercepted by the apparatus and not sent on to a network containing the application;
   build a routing token that includes an original physical IP address associated with the service when a policy associated with the IS permits access to the service by a user identity associated with the authenticated desktop client; and
   transmit the routing token to a validation node so that the application can be connected using an original connection to the service via the authenticated desktop client after the validation node has validated the routing token; and
   a second node to host the service.

5. The system of claim 4, further comprising.
   a third node to host the desktop client.

6. The system of claim 5, wherein the third node includes a secure sockets layer virtual private network (SSL-VPN) module coupled to the application.

7. A processor-implemented, method to execute on one or more processors that perform the method, comprising:
   authenticating a desktop client to an identity service (IS);
   receiving a request, from an application, at the IS via the desktop client, for a virtual service internet protocol (IP) address associated with a service, the receiving including intercepting the virtual service IP and not sending the virtual IP on to a network containing the application;
   building a routing token, by the IS, to include an original physical IP address associated with the service when a policy associated with the IS permits access to the service by a user identity associated with the desktop client; and
   after validating the routing token, connecting the application using an original connection to the service via the desktop client.

8. The method of claim 7, further comprising:
   detecting an error associated with accessing the service in the original connection;
   requesting, by the desktop client, a new physical address associated ith the service;
   receiving the new physical address at the desktop client; and
   making a new connection from the application to the service at the new physical address via the desktop client.

9. The method of claim 7, further comprising:
   receiving, by the IS, an indication that the original physical address associated with the service has been changed to a new physical address; and
   transmitting, from the IS, the new physical address to the desktop client.

10. The method of claim 9, wherein the receiving comprises:
    receiving the indication from a workload management system.

11. The method of claim 9, wherein the transmitting further comprises:
    transmitting the new physical address to a secure sockets layer virtual private network (SSL-VPN) module forming part of the desktop client.

12. The method of claim 7, further comprising:
    transmitting the routing token via a secure network connection to a node hosting the service.

13. The method of claim 7, further comprising:
validating the routing token by a node hosting the service.

14. A processor-implemented method to execute on one or more processors that perform the method, comprising:
authenticating a desktop client to an identity service (IS);
receiving a request, from one of an e-mail application or a remote control application, at the IS via the desktop client, for a virtual service internet protocol (IP) address associated with a service, the receiving including intercepting the virtual service IP and not sending the virtual IP on to a network containing the application;
building a routing token, by the IS, to include an original physical IP address associated with the service when a policy associated with the IS permits access to the service by a user identity associated with the desktop client; and
after validating the routing token, connecting the one of the e-mail application or the remote control application using an original connection to the service via the desktop client.

15. The method of claim 14, further comprising:
receiving the virtual service IP address and a port as an address-port pair at the desktop client in response to the request.

16. The method of claim 14, further comprising:
detecting an error due to the service not being available; and
starting the service.

17. The method of claim 16, wherein the starting comprises:
starting the service using a workload management system.

18. The method of claim 14, wherein the validating comprises:
validating the routing token at a secure sockets layer virtual private network (SSL-VPN) server.

19. The method of claim 18, wherein the connecting comprises:
connecting the service to the one of the e-mail application or the remote control application via the SSL-VPN server.

20. The method of claim 14, wherein the connecting comprises:
connecting the service as an e-mail service on an e-mail server to the e-mail application without using an SSL-VPN server.

* * * * *

UNITED STATES PATENT AND TRADEMARK OFFICE
CERTIFICATE OF CORRECTION

PATENT NO.        : 8,474,009 B2
APPLICATION NO.   : 12/787727
DATED             : June 25, 2013
INVENTOR(S)       : Burch et al.

Page 1 of 1

It is certified that error appears in the above-identified patent and that said Letters Patent is hereby corrected as shown below:

In the claims:

In column 10, line 20, in claim 5, delete "comprising." and insert --comprising:--, therefor In column 10, line 25, in claim 7, after "implemented", delete ",", therefor In column 10, line 45, in claim 8, delete "ith" and insert --with--, therefor Signed and Sealed this
Twenty-second Day of April, 2014

Michelle K. Lee
*Deputy Director of the United States Patent and Trademark Office*